(12) United States Patent
de La Chapelle et al.

(10) Patent No.: US 7,120,389 B2
(45) Date of Patent: *Oct. 10, 2006

(54) COMMUNICATIONS SYSTEM AND METHOD EMPLOYING FORWARD SATELLITE LINKS USING MULTIPLE SIMULTANEOUS DATA RATES

(75) Inventors: Michael de La Chapelle, Bellevue, WA (US); David S Parkman, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/993,500

(22) Filed: Nov. 19, 2004

(65) Prior Publication Data

US 2005/0070222 A1    Mar. 31, 2005

Related U.S. Application Data

(63) Continuation of application No. 09/943,679, filed on Aug. 30, 2001, now Pat. No. 6,847,801.

(51) Int. Cl.
*H04B 7/185* (2006.01)
*H04Q 7/20* (2006.01)

(52) U.S. Cl. .................... 455/12.1; 455/13.1; 455/427

(58) Field of Classification Search ............... 455/12.1, 455/13.1, 427, 456.1, 414.1, 3.01, 3.02, 428, 455/429, 500, 13.2; 370/313, 342, 468
See application file for complete search history.

(56) References Cited

U.S. PATENT DOCUMENTS

| 3,972,045 A | 7/1976 | Perret |
| 4,392,139 A | 7/1983 | Aoyama et al. |
| 4,743,906 A | 5/1988 | Fullerton |
| 4,866,515 A | 9/1989 | Tagawa et al. |
| 4,901,307 A | 2/1990 | Gilhousen et al. |
| 4,958,381 A | 9/1990 | Toyoshima |
| 5,127,021 A | 6/1992 | Schreiber |
| 5,146,234 A | 9/1992 | Lalezari |
| 5,230,076 A | 7/1993 | Wilkinson |
| 5,249,303 A | 9/1993 | Goeken |
| 5,285,470 A | 2/1994 | Schreiber |

(Continued)

FOREIGN PATENT DOCUMENTS

DE    198 56 231 A1    6/2000

(Continued)

OTHER PUBLICATIONS

Paper entitled "Boeing Satellite Television Airplane Receiving System (STARS) Performance" by Edward J. Vertatschitsch and George W. Fitzsimmons.

*Primary Examiner*—Edan Orgad
(74) *Attorney, Agent, or Firm*—Harness Dickey & Pierce P.L.C.

(57) ABSTRACT

A communication system and method for transmitting data to mobile platforms using multiple simultaneous channels operating at multiple data rates. Each mobile receiver has the capability to receive multiple transmit channels at multiple data rates. Mobile platforms report their position to a ground based controller which determines which communication channel can be operated without substantial loss of data. Data packets destined for each aircraft are preferably routed to the highest data rate channel that can be received by that mobile platform without substantial loss of data. This maximizes the overall system efficiency and throughput. High priority and mission critical data may be transmitted to the aircraft using low data rate channels to increase link availability.

23 Claims, 9 Drawing Sheets

U.S. PATENT DOCUMENTS

| | | |
|---|---|---|
| 5,289,272 A | 2/1994 | Rabowsky et al. |
| 5,311,302 A | 5/1994 | Berry et al. |
| 5,313,457 A | 5/1994 | Hostetter et al. |
| 5,463,656 A | 10/1995 | Polivka et al. |
| 5,495,258 A | 2/1996 | Muhlhauser et al. |
| 5,524,272 A | 6/1996 | Podowski et al. |
| 5,555,466 A | 9/1996 | Scribner et al. |
| 5,583,735 A | 12/1996 | Pease et al. |
| 5,751,761 A * | 5/1998 | Gilhousen .................. 375/146 |
| 5,760,819 A | 6/1998 | Sklar et al. |
| 5,790,175 A | 8/1998 | Sklar et al. |
| 5,801,751 A | 9/1998 | Sklar et al. |
| 6,018,659 A | 1/2000 | Ayyagrai et al. |
| 6,034,634 A | 3/2000 | Karrisson et al. |
| 6,047,165 A | 4/2000 | Wright et al. |
| 6,104,914 A | 8/2000 | Wright et al. |
| 6,108,523 A | 8/2000 | Wright et al. |
| 6,741,841 B1 * | 5/2004 | Mitchell .................. 455/188.1 |
| 6,847,801 B1 * | 1/2005 | de La Chapelle et al. . 455/12.1 |
| 2002/0018527 A1 * | 2/2002 | Vanderaar et al. .......... 375/259 |

FOREIGN PATENT DOCUMENTS

EP          0 883 252 A2    12/1998

* cited by examiner

FIG. 1.

2 Mbps

FIG. 3A.

8 Mbps

COMMUNICATIONS SYSTEM AND METHOD EMPLOYING FORWARD SATELLITE LINKS USING MULTIPLE SIMULTANEOUS DATA RATES

CROSS-REFERENCE TO RELATED APPLICATIONS

This application is a continuation of U.S. patent application Ser. No. 09/943,679 filed on Aug. 30, 2001, now U.S. Pat. No. 6,847,801 presently allowed, the disclosure of which is incorporated herein by reference.

FIELD OF THE INVENTION

The present invention relates to communication systems and methods employing satellite links, and more particularly to a communication system employing satellite links using multiple simultaneous data rates to optimize the data throughput and coverage to multiple geographically distributed users.

BACKGROUND OF THE INVENTION

The performance of a communication link between a satellite and a mobile platform (i.e., aircraft, ship, train, truck, etc) is influenced by many factors. Most prominently is the effective isotropic radiated power (EIRP) of the satellite antenna, in addition to the slant range, rain loss, and Gain over noise temperature (G/T) of the receive antenna being used to form the link with the satellite. The EIRP of satellite transponders typically varies across a coverage region, as does the slant range and rain loss. In addition, some antennas, such as a planar phased array antennas, exhibit a large G/T reduction with increasing scan angle. The antenna scan angle, and hence the receive G/T, can vary significantly with the location and attitude (pitch, roll and yaw) of the mobile platform. The result is that the performance of a communication link from the satellite to the mobile platform can vary over a large range depending on whether the mobile platform is in a favorable or unfavorable location and attitude (relative to the satellite) in a coverage region. In practice, this performance variation can be as large as 10× (10 dB) over a coverage region. Performance variation can become even larger when the mobile receivers use different size aperture antennas. Larger antennas provide better link performance. Link performance can be defined in many ways. In this context, it is defined as the maximum data rate at which the communication link can operate with a given bit error rate (BER), as described further in the following paragraphs.

Figure 1:
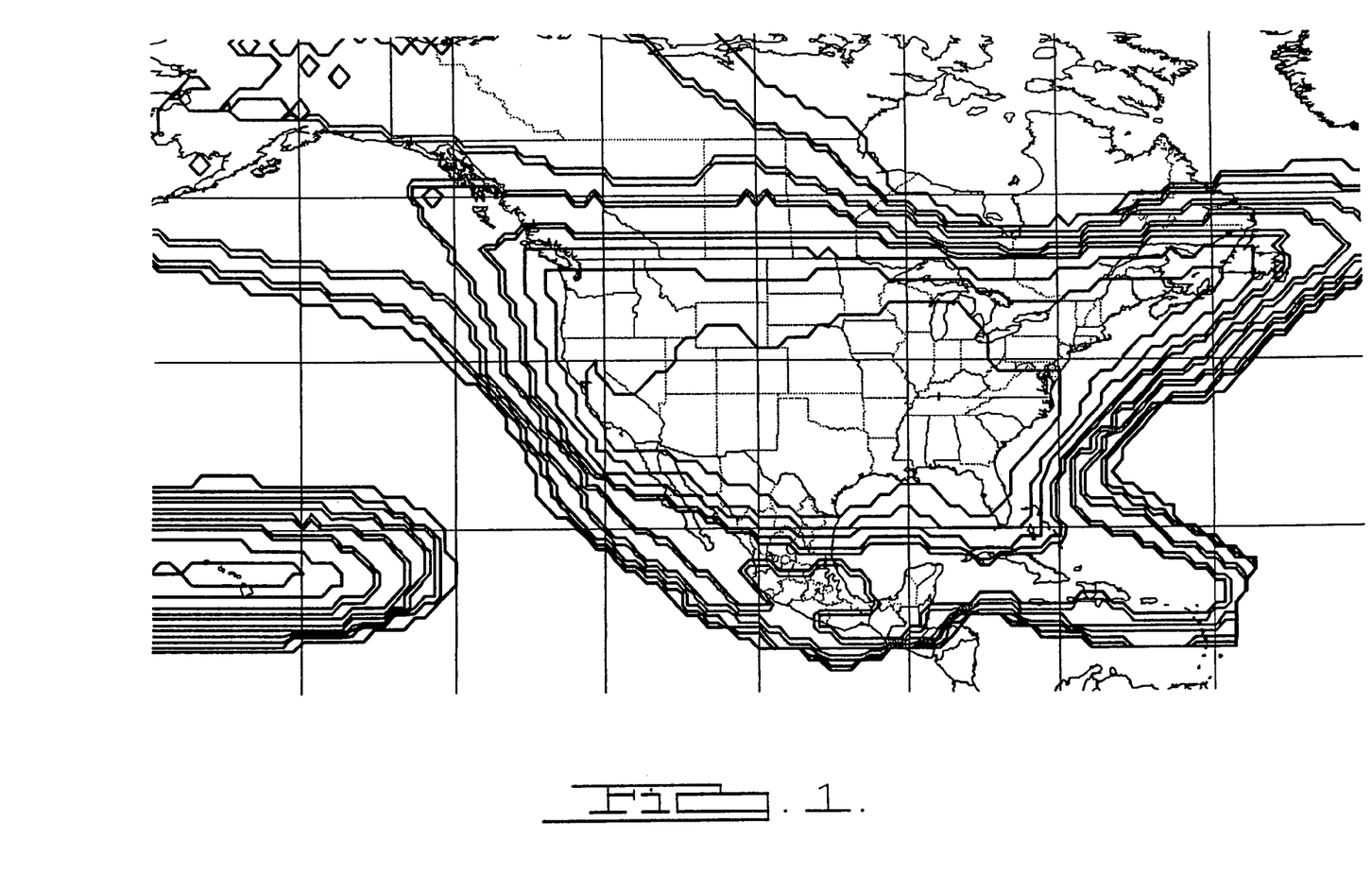
FIG. 1 is an illustration of a map of the continental United States (CONUS) showing the EIRP variation for a typical Ku-band geostationary satellite transponder (i.e., Telstar 6) at 93° W longitude, and showing the variation in dBW across this coverage area.

The present discussion refers to mobile platforms that are in less favorable locations and operating with smaller aperture antennas as being "disadvantaged", while mobile users in favorable locations and operating with larger antenna apertures are referred to as "advantaged". One factor that determines the performance or degree of favor for a particular location in satellite coverage region is illustrated with reference to FIG. 1. The EIRP variation for a typical Ku-band geostationary satellite transponder (e.g. Telstar 6 at 63° west longitude) is shown in FIG. 1. Notice that there is about 2 dB variation across the continental United States (CONUS) coverage area. As mentioned previously, other factors can cause a large change in performance across a coverage region. Table 1 below shows the effect of slant range and antenna scan angle loss across CONUS. The scan angle loss for a planar phased array antenna manufactured by The Boeing Company is approximately equal to $\cos^{1.2}(\theta)$, where $\theta$ is the elevation scan angle to the target satellite, measured with respect to an axis extending perpendicular to the planar aperture.

| Location | Free Space Loss (dB) | Antenna Scan Loss (db) |
|---|---|---|
| Seattle, WA | 205.8 | 3.5 |
| Brownsville, TX | 205.3 | 0.7 |
| Delta (dB) | 0.5 | 2.8 |

An analysis can be performed to determine the highest date rate at which a communication link may be operated with a specified bit error rate (BER). Further to the present discussion, a communication link is considered to be "closed" or "available" when it achieves less than some threshold BER. For this discussion, the threshold BER is assumed to be 1E-9, or one erred bit for every billion received. Any excess received power beyond that required to "close" the link is referred to as "margin". In the present discussion, the term "data rate" will be used, however, an even more accurate term for "data rate" is "information rate", which is the available data rate after removing forward error correction (FEC) and other overhead information. Thus, the terms "data rate" and "information rate" will be used interchangeably throughout the following discussion, although "information rate" is, strictly speaking, a more accurate term to describe the available data rate of a communication link. A user that is in a favorable location within a coverage region is one that can close his communication link at a higher data rate. Alternatively, a challenged user, or a user in a less favorable location within a coverage region, will only be able to achieve communication link closure using lower data rates.

Figure 2:
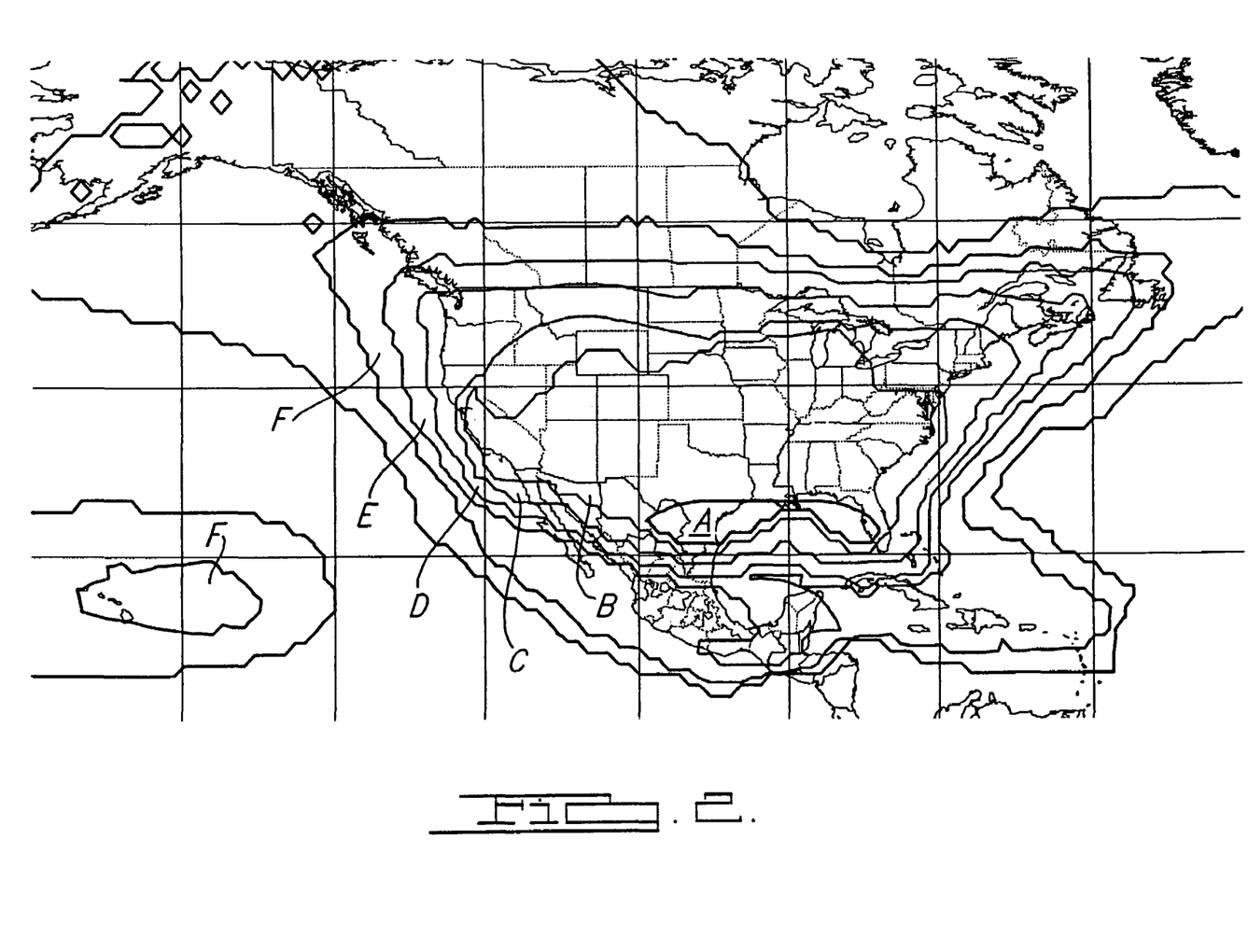
FIG. 2 illustrates the various subregions of the continental United States and the maximum information transmission rates (in units of Mega bits per second) which can be used in each subregion when the Telstar 6 satellite is used as the space-based component linking ground station with a mobile platform operating within each of the subregions.

Referring to FIG. 2, this figure shows contours of the highest data rates at which links can be "closed" using a Ku-band transponder on Telstar 6 using a Boeing planar phased array receive antenna having an active aperture measuring 17 inch (43.18 cm)×24 inch (60.96 cm) and having 1500 elements mounted flat on the crown of an aircraft flying in level attitude. The analysis used to generate this is highly sophisticated and includes the effect of adjacent satellite interference. Adjacent satellite interference is caused by the use of small aperture mobile antennas and the elongation of the phased array antenna beam that occurs with increasing scan angle. Adjacent satellite interference causes further variations in the link performance across a coverage region. The contours are generated by performing a link analysis at equally spaced geographic grid points and constructing performance contours. At each grid point the aircraft is rotated 360° in heading to find the worst case heading. The maximum data rate at which the link can be closed for the worst case heading is shown in FIG. 2. Within region A, the maximum channel data rate at which the link can be closed is 12 Mbps. Within region B a maximum channel data rate of 10 Mbps can be used. Within region C a maximum of 8 Mbps, within region D, 6 Mbps; within Region E, 4 Mbps; and within region F, a maximum of 2 Mbps can be utilized.

A communication system using a single forward link data rate would have to operate at a data rate commensurate with the most disadvantaged mobile platform in the coverage region. By "forward link" it is meant a signal from a satellite to the mobile platform. Typically, system designers select the highest data rate at which the communication link can be closed to the most disadvantaged mobile platform in a given coverage region. For example, suppose that one wishes to choose a single data rate for communication across CONUS. FIG. 2 shows that the 6 Mbps contour covers nearly all of CONUS except for a tiny slice of land in northern North Dakota. Therefore, 5–6 Mbps would be a good choice for CONUS operation. However, there are regions within CONUS at which the link can be closed at twice this data rate (i.e., 12 Mbps). Therefore, operation with a single data rate is very inefficient because there are typically many advantaged mobile platforms that can operate at much higher data rates. In other words, the advantaged mobile platforms have large excess margins in their forward links which is being wasted when a single, lower, data rate channel is used to service all mobile platforms operating within a given coverage region.

Figure 3A:
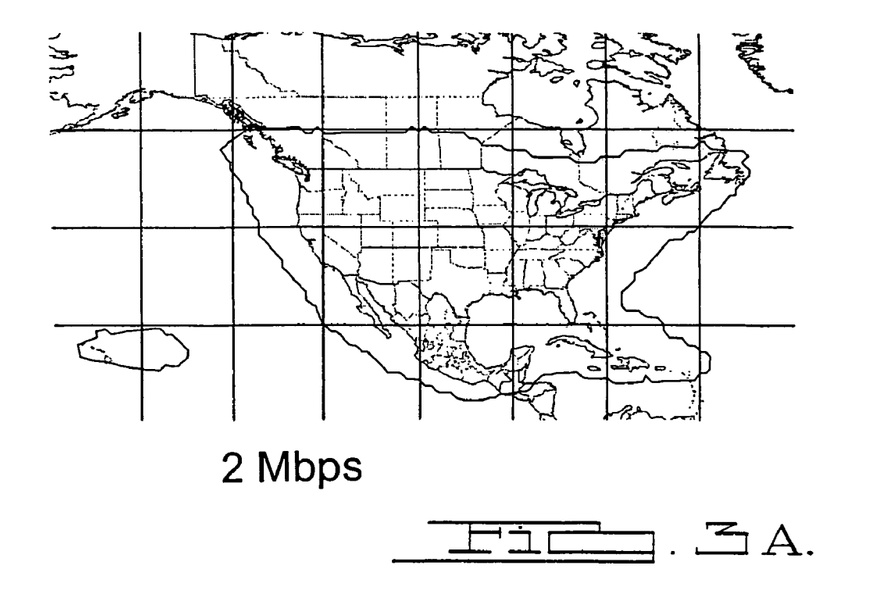
FIGS. 3a and 3b are examples of the coverage vs. capacity tradeoff in selecting a forward link information transmission rate, the lower data giving the greater coverage area, and vice versa.
Figure 3B:
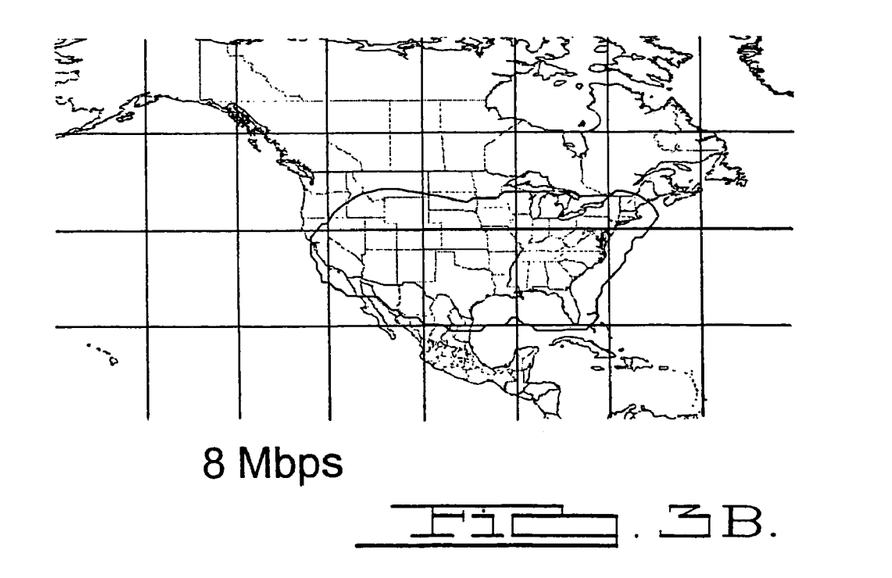

There is also a "coverage vs. capacity" tradeoff associated with the selection of a single forward link data rate. A low data rate (i.e., low capacity) permits the link to be closed over a wider coverage area. In contrast, a high data rate is only available in a small coverage area. FIG. 3 shows the difference in coverage area for 2 Mbps and 8 Mbps. The 2 Mbps region is greater than 3 times the area of the 8 Mbps region. If multiple data rates could be employed, then both wide coverage and high capacity could be achieved. This is not possible when operating with a single data transmission rate.

Another problem that must be considered is that the most disadvantaged mobile platform typically operates with little or no margin, which means that the communication link is not very robust. For example, suppose a disadvantaged mobile platform (e.g., an aircraft) must operate with a forward link data rate chosen so that the communication link with the satellite is barely closed. Now suppose that the aircraft banks away from the satellite during flight. If the aircraft is using a planar phased array antenna mounted flush on the crown of the aircraft, then the scan angle to the satellite will increase and the G/T will decrease. This can cause a loss of the communication link. Similarly, the aircraft could stray outside the designated coverage region and lose its communication link.

In summary, problems with the existing "single data rate" approach include capacity inefficiency and lack of robustness (i.e., lack of margin). The lack of robustness can cause a loss of the communication link if the operational environment is adversely affected such as by adverse weather. Rain loss as well as standing water and/or ice on the aircraft receive antenna radome or aperture also represents situations where the lack of robustness of a single data rate approach can compromise the ability to achieve and maintain link closure with a mobile platform. The lack of margin also makes it more difficult to initially acquire the target satellite if the antenna on the mobile platform is not pointed precisely at the target satellite.

One method for addressing the above-described problem of managing communications links with a number of different mobile platforms capable of operating at varying data rates within a given coverage region could involve the use of a single carrier that is continuously switched between different data rates. Data packets sent to advantaged mobile platforms could be sent at a higher data rate than to disadvantaged mobile platforms. Making such "on-the-fly" data rate changes requires significant time to synchronize the mobile platform RF receiver to each burst of data that is received at different data rates, resulting in a loss of efficiency. Also, burst mode receivers are far more complex, expensive, and provide reduced performances compared with continuous mode receivers, which are used in the invention.

Another approach for solving the above-described problem in addressing multiple mobile platforms capable of communicating at different data rates is the well known "fade mitigation" method. This method is employed with the Advanced Communication Technology Satellite ("ACTS") operated by the National Aeronautics and Space Administration (NASA). This method involves reducing the information transmission rate during a rain fade. More specifically, it works by adding forward error correction (FEC) coding during a fade event and removing it during clear weather conditions. Since the bit rate is constant, the addition of FEC overhead reduces the information rate during a fade event and increases it in clear weather. Such a method could be used to efficiently service advantaged and disadvantaged mobile platforms, except for the fact that this approach has insufficient dynamic range. As previously mentioned, the dynamic range between advantaged and disadvantaged mobile terminals is typically more than 10 dB in a coverage region. FEC will provide at most only about five dB of dynamic range. Thus, this method would be unsuitable for use in connection with mobile platforms operating within a relatively large coverage region such as CONUS.

SUMMARY OF THE INVENTION

The present invention is directed to a system and method for providing a satellite communication link between a base station and a plurality of mobile platforms by using multiple simultaneous communication channels operating at different data transmission rates to increase the link throughput, coverage and reliability. The method and apparatus of the present invention utilizes transmitting data from a satellite to many geographically distributed mobile platforms via multiple carriers, wherein each carrier forms a single, independent communication channel and each of the mobile platforms has the ability to simultaneously receive multiple channels. The channels are operated at multiple transmission rates chosen to optimize the throughput, geographic coverage and reliability of the communication links.

In one preferred embodiment the present invention employs a ground based communication system operable to transmit information on a selected one of a plurality of channels, and therefore at a selected one of a plurality of different information transmission rates. A space based transponder system is employed for transponding the information from the ground based communication system over the selected one of the plurality of communication channels to a mobile platform incorporating a plurality of radio frequency (RF) receivers. The selected information rate/channel is determined in part by the geographic location of the mobile platform at any given time within a coverage region. The ground based communication system selects the maximum information transmission rate that can be utilized by each mobile platform based in part on the mobile platform's position within the coverage region at any given time. This is performed in real time as the mobile platform traverses the coverage region. The ground based communication system routes data destined to a particular mobile platform to the communication channel operating at the highest data rate in which link closure to the mobile platform is possible.

In the preferred embodiment each mobile platform incorporates a plurality of receivers, each of which is tuned to a different satellite transponder channel that is operating at more than one data rate. As the mobile platform traverses a coverage region, it will be able to close the communication link on at least one of the different communication channels. Therefore, at least one of the plurality of operational receivers on each mobile platform will be successfully receiving data at any time. The ground based system knows which communication channels are viable (which ones can achieve link closure) by real time knowledge of the platform's position within the coverage region (as shown in FIG. 2). When the link does not close on a data channel, a high percentage of the received data packets contain errors, and the receiver discards the data. So data must be sent from the ground based system to the mobile platform using only the communication channels that are closed, otherwise data will be lost. The ground based system decides which one, of the plurality of communication channels being received by the mobile platform, to send the data destined for that mobile platform. The ground based system typically selects the highest data rate communication channel on which link closure is achieved. In this manner, the information transmission rate can be tailored for each particular mobile platform as it moves between the various subregions of a given coverage region in a manner which maximizes the overall information transmission rate so that overall communication efficiency is increased but without causing a loss of data to any particular mobile platform.

The method and apparatus of the present invention thus allows multiple information transmission rates to be used with multiple mobile platforms without causing a loss of data to any given aircraft, and further without under-utilizing the link capacity of any given aircraft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein;

FIG. 9 illustrates the use of load balancing when considering a selection of channel information transmission rates within a given coverage region.

DETAILED DESCRIPTION OF THE PREFERRED EMBODIMENTS

The following description of the preferred embodiment(s) is merely exemplary in nature and is in no way intended to limit the invention, its application, or uses.

Figure 4:
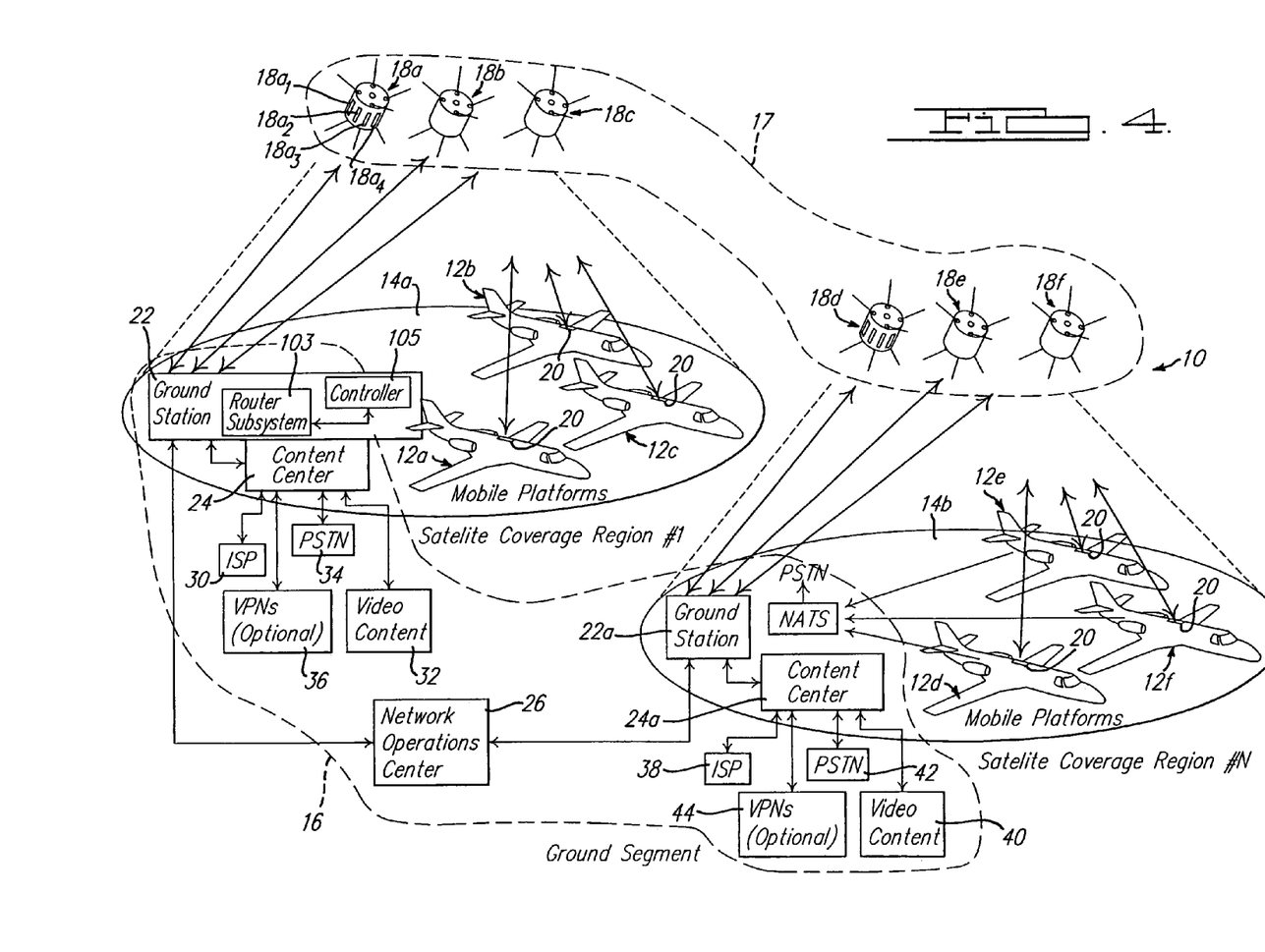
FIG. 4 is a simplified representation of an exemplary communication system which may be used to implement the system and method of the present invention.

Referring to FIG. 4, there is shown a system 10 in accordance with a preferred embodiment of the present invention for providing data content to and from a plurality of moving platforms 12a–12f in one or more distinct coverage regions 14a and 14b. The system 10 generally comprises a ground segment 16, a plurality of satellites 18a–18f forming a space segment 17, and a mobile system 20 disposed on each moving platform 12. The moving platforms 12 could comprise aircraft, cruise ships or any other moving vehicle. Thus, the illustration of the moving platforms 12 as aircraft in the figures herein, and the reference to the mobile platforms as aircraft throughout the following description should not be construed as limiting the applicability of the system 10 to only aircraft.

The space segment 17 may include any number of satellites 18 in each coverage region 14a and 14b needed to provide coverage for each region. Satellites 18a–18f are preferably Ku or Ka-band satellites, but could be any frequency from 10 MHz to 100 GHz. Each of the satellites 18 are further located in a geostationary orbit (GSO) or a non-geostationary orbit (NGSO). Examples of possible NGSO orbits that could be used with this invention include low Earth orbit (LEO), medium Earth orbit (MEO) and highly elliptical orbit (HEO). Each of the satellites 18 includes at least one radio frequency (RF) transponder, and more preferably a plurality of RF transponders. For example satellite 18a is illustrated having four transponders $18a_1$–$18a_6$ (four of which are visible in FIG. 4). It will be appreciated that each other satellite 18 illustrated could have a greater or lesser plurality of RF transponders as required to handle the anticipated number of aircraft 12 operating in the coverage area. The transponders provide "bent-pipe" communications between the aircraft 12 and the ground segment 16. The frequency bands used for these communication links could comprise any radio frequency band from approximately 10 MHz to 100 GHz. The transponders preferably comprise Ku-band transponders in the frequency band designated by the Federal Communications Commission (FCC) and the International Telecommunications Union (ITU) for fixed satellite services FSS or BSS satellites.

With further reference to FIG. 4, the ground segment 16 includes a ground station 22 in bi-directional communication with a content center 24 and a network operations center (NOC) 26. A second ground station 22a located in the second coverage area 14b may be used if more than one distinct coverage area is required for the service. In this instance, ground station 22a would also be in bi-directional communication with the NOC 26 via a terrestrial ground link or any other suitable means for establishing a communication link with the NOC 26. The ground station 22*a* would also be in bi-directional communication with a content center 24*a*. For the purpose of discussion, the system 10 will be described with respect to the operations occurring in coverage region 14*a*. It will also be appreciated that while the system 10 has been illustrated as having two distinct coverage regions, that for the purpose of the present invention only a single coverage region is required. However, it will be understood that identical operations relative to the satellites 18*d*–18*f* occur in coverage region 14*b*. It will also be understood that the invention may be scaled to any number of coverage regions 14 in the manner just described.

The ground station 22 comprises an antenna and associated antenna control electronics needed for transmitting data content to the satellites 18*a* and 18*b*. The antenna of the ground station 22 may also be used to receive data content transponded by the transponders $18a_1$–$18a_6$ originating from each mobile system 20 of each aircraft 12 within the coverage region 14*a*. The ground station 22 may be located anywhere within the coverage region 14*a*. Similarly, ground station 22*a*, if incorporated, can be located anywhere within the second coverage area 14*b*.

The content center 24 is in communication with a variety of external data content providers and controls the transmission of video and data information received by it to the ground station 22. The content center 24 may be in contact with an Internet service provider (ISP) 30, a video content source 32 and/or a public switched telephone network (PSTN) 34. The content center 24 may also communicate with one or more virtual private networks (VPNs) 36. The ISP 30 provides Internet access to each of the occupants of each aircraft 12. The video content source 32 provides live television programming, for example, Cable News Network7 (CNN) and ESPN7. The NOC 26 performs traditional network management, user authentication, accounting, customer service and billing tasks. The content center 24*a* associated with the ground station 22*a* in the second coverage region 14*b* may also be in communication with an ISP 38, a video content provider 40, a PSTN 42, and optionally a VPN 44.

Figure 5:
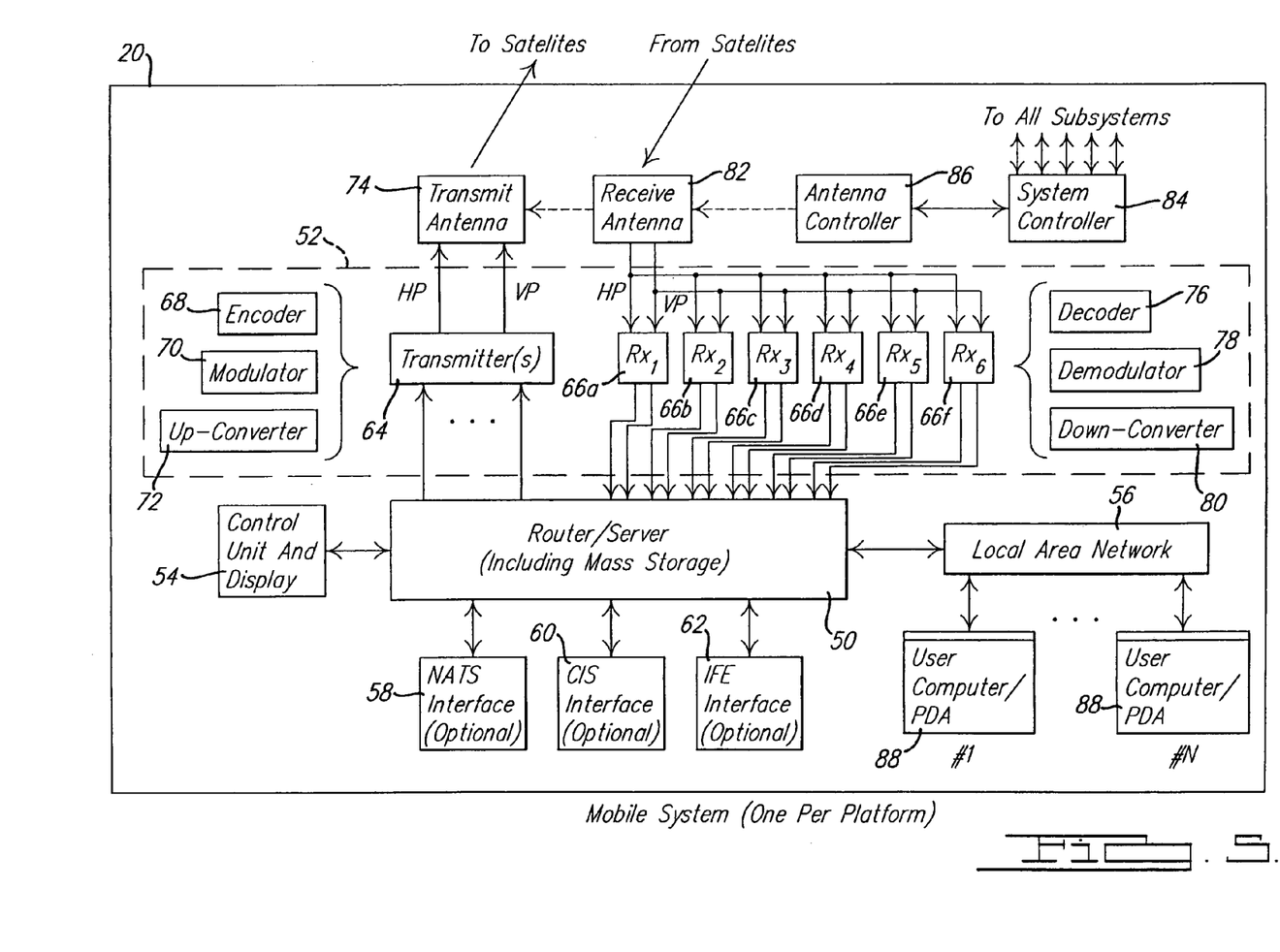
FIG. 5 is a detailed block diagram of a mobile terminal used on each of the aircraft shown in FIG. 4.

Referring now to FIG. 5, the mobile system 20 disposed on each aircraft 12 will be described in greater detail. Each mobile system 20 includes a data content management system in the form of a router/server 50 (hereinafter "server") which is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem comprising a plurality of receivers 66. While a plurality of six receivers 66*a*–66*f* are illustrated, it will be appreciated that a greater or lesser plurality of receivers could be employed. The transmitter subsystem 64 includes an encoder 68, a modulator 70 and an up-converter 72 for encoding, modulating and up-converting information content signals from the server 50 to a transmit antenna 74. The receiver subsystem 66 includes a decoder 76, a demodulator 78 and a down-converter 80 for decoding, demodulating and down-converting signals received by the receive antenna 82 into baseband video and audio signals, as well as data signals.

The signals received by the receiver subsystem 66 are then input to the router/server 50. A system controller 84 is used to control all subsystems of the mobile system 20. The system controller 84, in particular, provides signals to an antenna controller 86 which is used to electronically steer the receive antenna 82 to maintain the receive antenna pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In this case the transmit antenna 74 and the receive antenna 82 are combined into a single antenna.

With further reference to FIG. 5, the local area network (LAN) 56 is used to interface the router/server 50 to a plurality of access stations 88 associated with each seat location on board the aircraft 12*a*. Each access station 88 can be used to interface the server 50 directly with a user's laptop computer, personal digital assistant (PDA) or other personal computing device of the user. The access stations 88 could also each comprise a seat back mounted computer/display. The LAN 56 enables bi-directional communication of data between the user's computing device and the server 50 such that each user is able to request a desired channel of television programming, access a desired website, access his/her email, or perform a wide variety of other tasks independently of the other users on board the aircraft 12.

The receive and transmit antennas 82 and 74, respectively, may comprise any form of steerable antenna. In one preferred form, these antennas comprise electronically scanned, phased array antennas. Phased array antennas are especially well suited for aviation applications where aerodynamic drag is important considerations. One particular form of electronically scanned, phased array antenna suitable for use with the present invention is disclosed in U.S. Pat. No. 5,886,671, assigned to The Boeing Co., which is hereby incorporated by reference.

Referring further to FIG. 4, in operation of the system 10, the data content is preferably formatted into packets before being transmitted by either the ground station 22, or from the transmit antenna 74 of each mobile system 20. For the purpose of discussion, a transmission of information (i.e., data) content in the form of packets from the ground station 22 will be referred to as a "forward link" transmission. Packet multiplexing is also preferably employed such that data content can be provided to each of the aircraft 12 operating within the coverage region 14*a* using unicast, transmissions.

The data content packets received by each of the transponders $18a_1$–$18a_4$ are then transponded by the transponders to each aircraft 12 operating within the coverage region 14*a*. While multiple satellites 18 are illustrated over coverage region 14*a*, it will be appreciated that at the present time, a single satellite (Telstar 6) is capable of providing coverage to an area encompassing the entire continental United States (CONUS). Thus, depending upon the geographic size of the coverage region and the mobile platform traffic anticipated within the region, it is possible that only a single satellite may be required to provide coverage for the entire region. Other distinct coverage regions besides CONUS include Europe, South/Central America, East Asia, Middle East, North Atlantic, etc. It is anticipated that in service regions larger than CONUS, that a plurality of satellites 18 each incorporating one or more transponders may be required to provide complete coverage of the region.

The receive antenna 82 and transmit antenna 74 are each preferably disposed on the top of the fuselage of their associated aircraft 12. The receive antenna 74 of each aircraft receives the entire RF transmission of encoded RF signals representing the data content packets from at least one of the transponders $18a_1$–$18a_4$. The receive antenna 82 receives horizontally polarized (HP) and vertically polarized (VP) signals which are input to the receivers 66a–66f. Each receiver 66a–66f decodes, demodulates and down-converts the encoded RF signals to produce video and audio signals, as well as data signals, that are input to the router/server 50. Data packets that have uncorrected errors are discarded by the receivers 66a–66f and are not passed to the router/server 50. The router/server 50 filters off and discards any data content not intended for users on the aircraft 12 and then forwards the remaining data content via the LAN 56 to the appropriate access stations 88. In this manner, each user receives only that portion of the programming or other information previously requested by the user.

Figure 6:
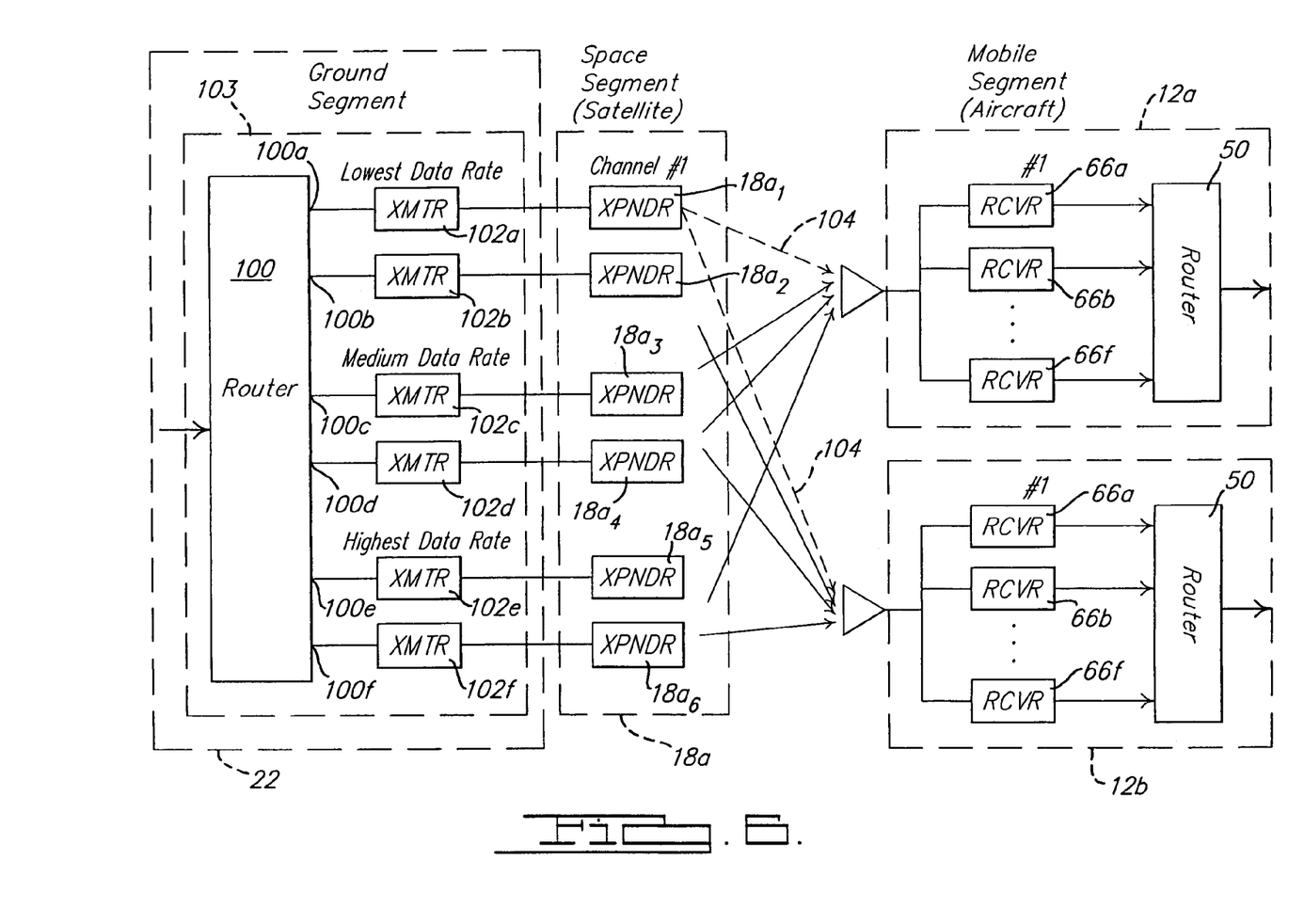
FIG. 6 is a block diagram illustrating multiple communications channels used by the present invention for communicating information at different information transmission rates to a pair of mobile terminals.

Referring to FIG. 6, the ground segment 16 can be seen to include a router 100 and a plurality of RF transmitters 102a–102f coupled to outputs 100a–100f of the router 100. The router 100 and the RF transmitters 102a–102f form a router subsystem 103 which preferably is provided as part of the ground station 22. However, it will be appreciated that it could be provided as a stand alone subsystem or in connection with other components of the ground system 16, or possibly even incorporated in the space based component 17 (i.e., on one of the satellites 18).

Preferably, at least one transmitter 102 (102a) operates at the lowest data rate (in this example 2 Mbps), while one transmitter 102 operates at a "medium" data rate (e.g., 6 Mbps), and one transmitter 102f operates at the highest transmission rate (i.e., 12 Mbps). In the example of FIG. 6, transmitter 102a may operate at 2 Mbps, transmitter 102b at 4 Mbps, transmitter 102c at 6 Mbps, transmitter 102d at 8 Mbps, transmitter 102e at 10 Mbps and transmitter 102f at 12 Mbps. It will be appreciated, however, that a greater or lesser number of transmitters may be incorporated to accommodate a greater or lesser dynamic range than the 10 db dynamic range provided for by the preferred embodiment of the present invention. In addition, the operational data rates selected for transmitters 102 are dependent on the particular communication system parameters.

Referring further to FIG. 6, for the purpose of explanation, satellite 18a is provided with six transponders $18a_1$–$18a_6$. Again, it will be appreciated that a greater or lesser number of transponders may be included to meet the needs (i.e., dynamic range, system capacity, etc.) dictated by the geographic size of a given coverage region. Transponder $18a_1$ is independently associated with transmitter 102a, transponder $18a2$ is independently associated with transmitter 102b and so forth. Each of the transmitters 102a–102f, in connection with their respective transponders $18a_1$–$18a_6$, thus forms a distinct, independent communication channel over which information is provided at a predetermined information transmission rate.

Referring further to FIG. 6, two mobile platforms 12a and 12b are illustrated in highly simplified form. Each mobile platform 12 includes a plurality of receivers 66, and in this example six receivers 66a–66f, as also explained in connection with FIG. 5. Again, it will be appreciated that a greater or lesser plurality of receivers can be incorporated on each mobile platform 12. However, the greater the number of receivers, the greater the number of different communication channels that the mobile terminal 20 will be able to receive without the need for re-tuning, and hence the greater the flexibility of the mobile terminal 20 in receiving information transmitted at varying information transmission rates. The output data streams from receivers 66a–66f are coupled to the input of mobile router 50. The data streams may contain data packets addressed to other aircraft 12 so the router 50 filters off only those packets addressed to the destination aircraft 12 and discards the remainder.

Each transponder $18a_1$–$18a_6$ may convey one or more transmit channels on separate RF carriers, but in one preferred embodiment there is one spread spectrum channel handled by each transponder. The ground router 100 directs data packets to the appropriate output 100a–100f so that the data packets are transmitted over the desired communications channel. The ground router 100 may direct data packets to whatever channel 100a–100f is available to a particular aircraft 12 with which the ground segment 26 is attempting to transmit information. Again, a disadvantaged aircraft 12 may only have link availability on the lowest information transmission rate channel (i.e., in this example the 2 Mbps channel), while an advantaged aircraft may have link availability on all channels. The preferred embodiment of the present invention also uses the ground router 100 to direct all critical data (i.e., all data pertaining to aircraft operation and flight conditions) to the lowest data rate channel, which in this instance is the 2 Mbps channel. This communication link is depicted by dashed lines 104 in FIG. 6. This low data rate link has the highest margin against fading. Amongst the many possible causes of channel fading are: scan angle loss (e.g., due to aircraft banking, etc.), rain, standing water/ice on the radome, etc. Sending critical data on this link also increases system reliability.

With further reference to FIG. 6, the preferred embodiment of the present invention 10 also routes all non-critical data packets to the highest data rate channel available to the aircraft 12. This maximizes the capacity and efficiency of the system 10. A handoff between data channels must occur for data packets to be redirected through a communication link operating at a different data rate.

Figure 7:
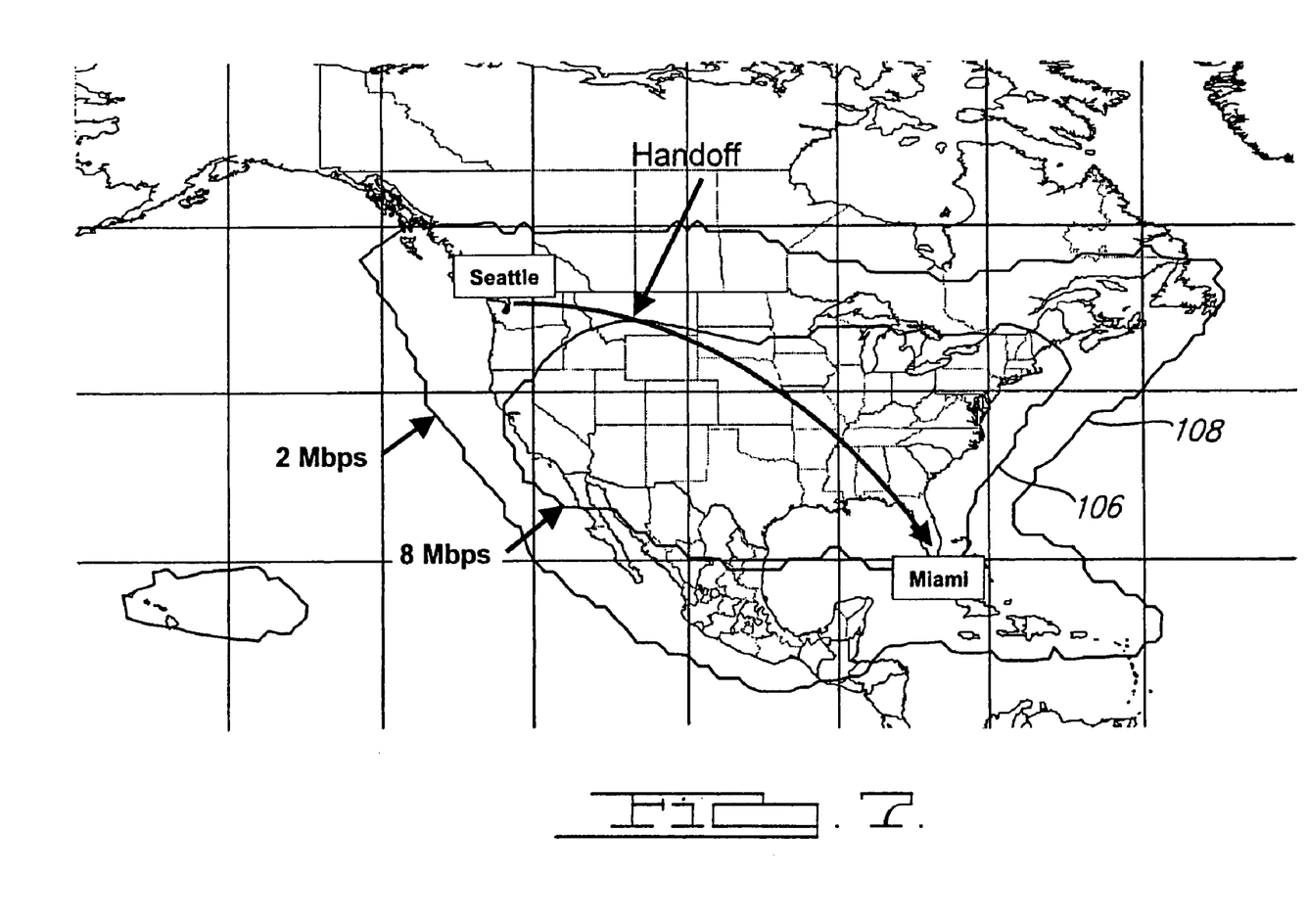
FIG. 7 is an illustration of the continental United States (CONUS) illustrating the point of a transmission handoff between the two Mbps coverage region and the 8 Mbps coverage region during a flight of an aircraft between Seattle and Miami.

An example of when the system 10 would hand off communications from one channel to another is shown in FIG. 7. The Telstar 6 satellite (in this example, satellite 18a), in conjunction with a Boeing phased array receive antenna, produces the data rate contours shown in FIG. 7. Contour 106 corresponds to an 8 Mbps information transmission rate channel while contour 108 corresponds to a 2 Mbps transmission rate channel. Within the 2 Mbps contour 108, an aircraft 12 flying in level attitude above 10,000 feet altitude achieves a greater than 99.9% link availability with less than 1E-9 BER while communicating at 2 Mbps. Likewise, within the 8 Mbps contour 106 there is greater than 99.9% availability and less than 1E-9 BER while communicating at 8 Mbps.

An aircraft 12 flying from Seattle to Miami would start in a region where only the 2 Mbps channel is available, as defined by contour 108, and then would transition into the region defined by contour 106 where an 8 Mbps channel is available. Within the area defined by contour 106, both the 8 Mbps data channel and the 2 Mbps channel are available. However, to achieve maximum efficiency from the system 10, the highest data rate channel would be selected by the system 10. The exception for this would be mission critical data which preferably always uses the lowest data rate channel (i.e., 2 Mbps) for maximum reliability.

When the aircraft 12 crosses into the 8 Mbps region, the ground router 100 switches (i.e., hands off) all non-critical data packets from the lower data rate channel (i.e., the 2 Mbps channel) to the higher, 8 Mbps, data rate channel. A principal advantage of the present invention 10 is that no retuning or reconfiguration is required on the aircraft 12 or with the satellite 18a when a channel handoff occurs. In one preferred embodiment of the invention, the aircraft receivers 66a–66f are tuned to specific transponder frequencies (or channels) when the aircraft 12 enters the service region (i.e. Continental United States) and remain tuned to these channels as the aircraft traverses the service region. When the link is available, data packets will be received on the aircraft 12 by all of the receivers 66a–66f. When the links are not available, no packets are received in receivers 66a–66f. In a preferred embodiment, the receivers 66a–66f discard heavily erred packets before sending them to mobile router 66. Thus, in the example illustrated in FIG. 7, the receiver 66 tuned to the 8 Mbps channel would produce erred data packets when its associated aircraft 12 is outside contour 106. The 8 Mbps link is not considered to be available outside of contour 106 so the ground router 100 would not switch data packets to the aircraft 12 using the 8 Mbps data transmission rate when it is in this region. Instead, the ground router 100 would switch data packets to the 2 Mbps channel when the aircraft is outside of contour 106 and inside of contour 108. Router 50 accepts packets from all receivers 66a–66f, and filters off those packets destined to that aircraft 12. Thus, the particular one of receivers 66a–66f which receives a particular data packet is irrelevant to the operation of the router 50

To enable data packets to be handed off from one communication channel to another, the ground based router 100 may employ a routing table which is updated to accomplish the needed handoff. The updating of this routing table can be accomplished in more than one way. One preferred method for updating involves using the position and attitude information reported from each aircraft 12 and using this information to calculate whether the communication link may be closed on each channel that the aircraft 12 is currently receiving. In practice, this operation could be table driven using data rate contour maps such as presented in FIGS. 2 and 7. When the aircraft 12 reaches a higher data rate region, the routing table is updated to route non-mission critical packets to the higher data rate channel and mission critical packets to the lower data rate channel.

Furthermore, while the contour maps illustrated in FIGS. 2 and 7 have been generated while considering level flight of an aircraft, it will be appreciated that a more sophisticated approach could be employed which would consider the attitude of the aircraft in determining which communication channels are available. These additional considerations could readily be implemented with the present invention 10 because of the continuous monitoring of the aircraft position and attitude.

An alternative method for updating the routing table involves continuously checking the availability of the communication channel to the aircraft 12 using "pings" from a ground based controller 105, as indicated in FIG. 1. The aircraft 12 is required to respond to a "ping" that is received on the forward link channels by replying on its return link. This method allows the ground based controller 105 to determine which forward link communications channels are available to each aircraft 12. The drawback to this method is the overhead and complexity associated with continuously pinging dozens, hundreds or even thousands of aircraft 12 operating within a given coverage region. While the controller 105 is indicated as being associated with the ground station 22, it will be appreciated that the controller 105 could be located anywhere within the ground segment 16.

An alternative embodiment of the invention would use one receiver 66 that is retuned to different data rate channels as the aircraft 12 traverses the coverage region. The aircraft 12 would either have a table that defines where to retune or the receiver 66 would periodically search, by cycling through the receive channels, to find the channel with the highest available data rate. The aircraft 12 would then inform the ground based controller 105 of the channel change. This requires the mobile terminal 20 of the aircraft 12 to coordinate with the ground based controller 105 during a handoff sequence.

Figure 8:
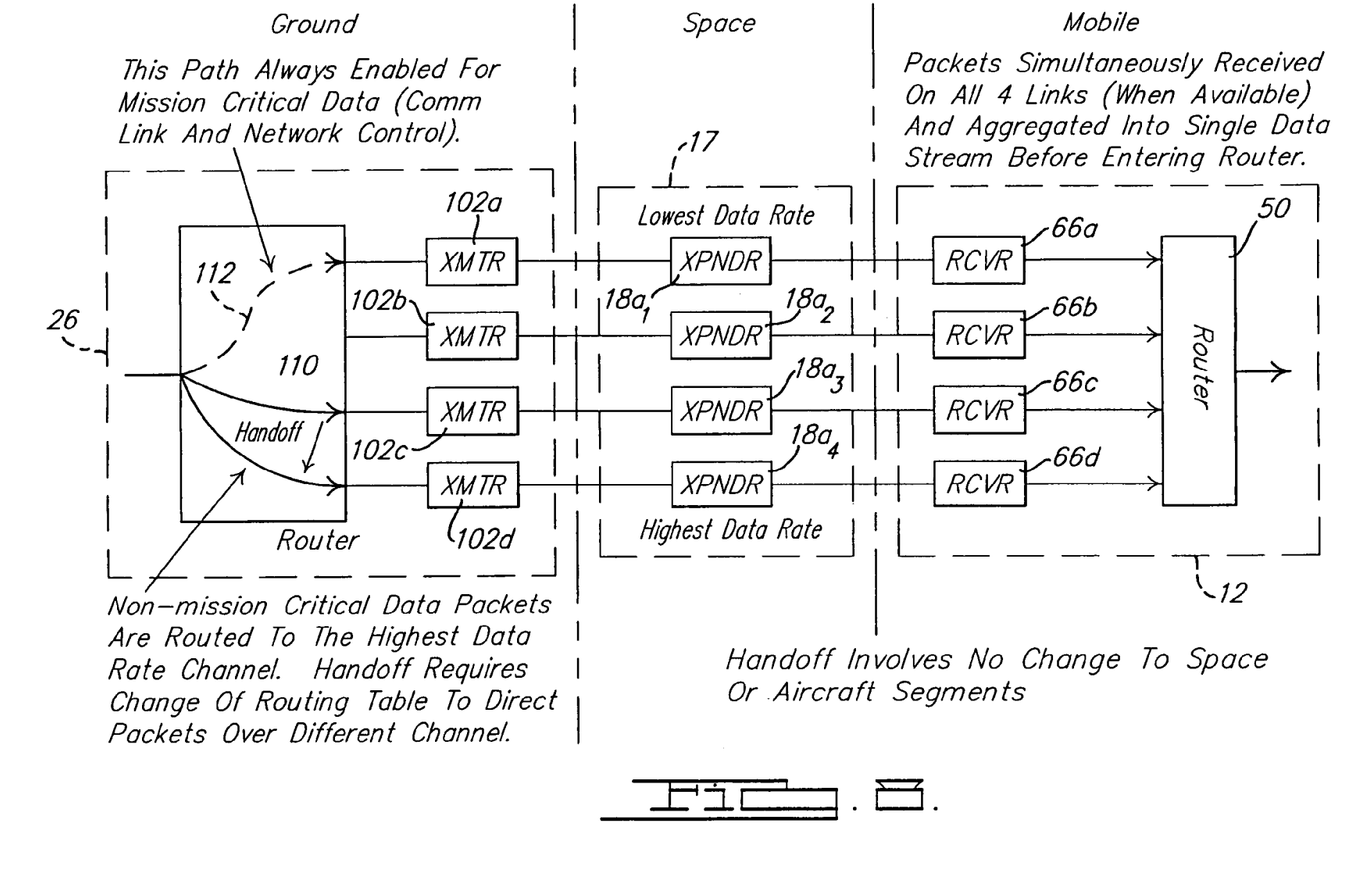
FIG. 8 is a block diagram illustrating the routing of non-mission critical data packets to the highest data rate channel.
Figure 11:
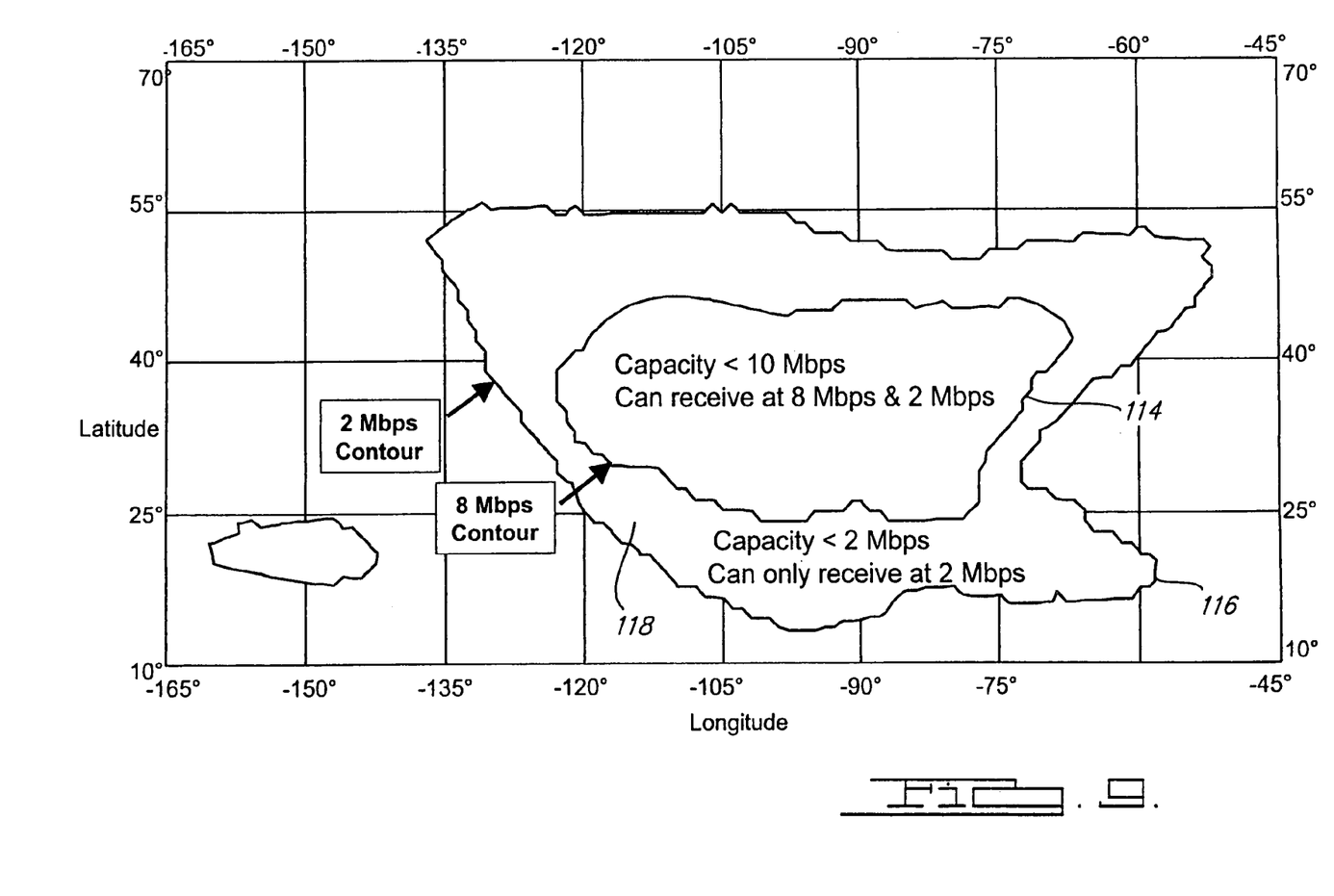

Referring to FIG. 8, this is essentially the same configuration of the embodiment as shown in FIG. 6, except that four transmitters 102a–102d are used with the ground segment 26, four transponders $18a_1$–$18a_4$ are used with the space segment 17 and four receivers 66a–66d are used with the mobile terminal 20 of an aircraft 12. This figure illustrates how the system 10, in one preferred embodiment, accomplishes a handoff of non-mission critical data between channels. In this example, the aircraft 12 is transitioning to a higher data rate region, so FIG. 8 shows the switching of packets directed to that aircraft 12 in the ground router from the lower data rate transmitter 102c to the higher data rate transmitter 102d, as indicated by arrow 110. This is accomplished by changing the routing table of the ground router. As mentioned previously, the routing tables are automatically updated by the ground controller based on position reports from the aircraft and a geographic map similar to FIG. 2 that shows the operational regions for each data rate channel. High priority or mission critical data is preferably routed through the lowest data rate channel, as depicted by data path 112 in FIG. 8.

As previously mentioned, the system 10 is generally useful for transmitting unicast content. The difference between unicast data transmission and multicast transmission is that unicast data packets are directed to individual mobile platforms 12 and multicast transmissions are directed to multiple aircraft 12 within a coverage region. Since multicast data is transmitted to a region, the transmissions must use a channel transmission rate that is available to all aircraft 12 in that region. Accordingly, the most disadvantaged aircraft 12 within the region will determine the maximum data rate at which multicast transmissions can occur. For example, if a transmitter was used to multicast/broadcast within CONUS, then FIG. 2 illustrates that the maximum multicast/unicast data rate is 6 Mbps. If a higher data rate were to be selected, then not all aircraft 12 would be able to receive the data. But if a lower data rate were selected, then capacity would be wasted on some aircraft 12. Thus, using multiple data rates provides no benefit for multicast/broadcast content. However, the system 10 can be used for transmitting multicast content, but it is likely that a system designer would choose to use only a single data rate. In the embodiment illustrated in FIG. 6, any number of the channels could be used to convey multicast/broadcast content.

Concerning channel transmission rates, the choice of specific channel transmission rates is preferably based on both achievable link closure data rates (as previously described) and the geographic distribution of users. For example, if it is desired to provide service in CONUS, where the data rate demand is quite high, and also to provide service in southern Canada, Mexico and the Caribbean, where the aggregate data rate demand is substantially less, then the system 10 may be implemented with only two data rate channels. A good choice of transmission rates based on the contours shown in FIG. 2 is 8 Mbps for the high demand region within CONUS and 2 Mbps for the low demand regions in Canada, Mexico and the Caribbean. These regions are illustrated in FIG. 9. The 8 Mbps region is indicated by reference numeral 114 and the 2 Mbps region indicated by reference numeral 116. Within the 8 Mbps region 114 packets can be received at either data rate. However, within the 2 Mbps region 116 but outside of the 8 Mbps region 114, defined by reference numeral 118, packets may only be received by the mobile platform 12 at 2 Mbps. Therefore, the aggregate load within geographic area 118 should not exceed 2 Mbps for proper load balancing.

A preferred embodiment of the system 10 can also use closed loop spatial tracking of the target satellite (i.e., satellite 18a) based on receive signal strength indications (RSSI) from the mobile platform receiver 66. The preferred embodiment uses RSSI from the lowest data rate channel for closed loop spatial tracking. Thus, in FIG. 8, the lowest data rate receiver 66a would generate a receive signal strength indication that would be coupled to the tracking system used to keep the receive and transmit antenna beams pointed at the satellite 18a while the aircraft 12 moves. This provides the maximum margin against signal fading and permits disadvantaged aircraft 12 to acquire and track the target satellite.

The system 10 thus provides for a means for maximizing the efficiency of information transmitted to one or more mobile platforms operating within a given coverage region as the mobile platform(s) travel throughout the coverage region, and further without causing a loss of the communication link between a ground station transmitting information to one or more mobile platforms. Most advantageously, no operator intervention is required on the mobile platforms in order to receive information at different information transmission rates. Even further, no configuration (automated or manual) is required on the mobile platform during a handoff between communication channels. Handoffs from one communication channel to another are accomplished seamlessly as a mobile platform travels within various subregions of a given coverage region. Information transmission rates are selected which allow the maximum transmission rate to be used for information transmitted to any given mobile platform, depending upon the mobile platform's location and attitude within the coverage region, without being too high to cause a loss of the communication link.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

The invention claimed is:

1. A communication system comprising:
  a central control subsystem;
  a space-based subsystem for receiving data from the central control subsystem and transmitting the data on a selected one of a plurality of transmitters to a receiving station such that said data is transmitted at a desired data rate determined by said central control subsystem;
  a plurality of receivers located at said receiving station for receiving said data, said receiving station using a selected one of said receivers that is configured to receive information at said desired data rate to receive said data being transmitted from said space-based subsystem; and
  wherein said central control subsystem transmits said data to said space-based subsystem data at a selected one of said data rates based on a monitored condition for said receiving station.

2. The system of claim 1, wherein said central control subsystem comprises a ground based control system.

3. The system of claim 1, wherein said central control subsystem operates to instruct said receiving station which one of said receivers to select for use to receive said data.

4. The system of claim 1, wherein said receiving station comprises a mobile platform.

5. The system of claim 1, wherein said monitored condition comprises a location of said receiving station.

6. The system of claim 1, wherein said monitored condition comprises a type of data being transmitted to said receiving station.

7. The system of claim 1, wherein said receiving station comprises a mobile platform traversing a plurality of subregions within a predetermined coverage region, and wherein said monitored condition comprises a real time location of said receiving station.

8. The system of claim 1, wherein central control subsystem comprises a routing table in which different data transmission rates are associated with different subregions within said coverage region, and selection of a given one of said data rates by said central control subsystem is made in accordance with said routing table.

9. A communication system comprising:
  a control subsystem transmitting data at a selected one of a plurality of different data rates;
  a space-based subsystem for receiving data from the control subsystem and transmitting the data on a selected one of a plurality of transmitters to a receiving station operating within a coverage region such that said data is transmitted at a selected data rate;
  a receiver subsystem including a plurality of receivers configured to receive data at different rate data rates; and located at said receiving station, for receiving said data transmitted from said space-based subsystem;
  said control subsystem operating to select a particular one of said data rates to use for transmission of said data such that a maximum data rate is used that is able to maintain closure of a communications link with said receiving station; and
  wherein said receiver subsystem comprises a plurality of receivers configured to receive data at different data rates.

10. The system of claim 9, wherein said receiving station comprises a mobile platform traveling within said coverage region.

11. The system of claim 9, wherein said control subsystem comprises a ground based control subsystem.

12. The system of claim 11, wherein said ground based control subsystem comprises a plurality of transmitters each configured to transmit data at a different transmission rate.

13. The system of claim 12, wherein said ground based control subsystem further comprises a router for routing data to a selected one of said plurality of transmitters.

14. The system of claim 11, wherein said ground based control system further comprises a routing table having said data rates associated with a plurality of subregions within said coverage region; and
  wherein said ground based control system selects a specific one of said data rates for use based on a location of said receiving station.

15. The system of claim 14, wherein said ground based control system accesses and selects different ones of said data rates from said routing table in real time.

16. A communications system comprising:
 a central control station for transmitting data at a plurality of different data rates;
 a space-based transponder for receiving said data and transmitting said data at a data rate selected by said central control station;
 a mobile platform operating within a designated coverage region being served by said space-based transponder, said mobile platform including a receiving subsystem for receiving data from said space-based transponder at a data rate selected by said central control station; and
 wherein said central control station selects a data rate for use based on whether said data is defined as relating to mobile platform operation or not.

17. The system of claim 16, wherein said central control station operates to select a data rate for transmitting said data that is less than a maximum transmission rate available to said control station for transmitting said data when said data is defined as relating to mobile platform operation.

18. The system of claim 17, further comprising a routing table accessible by said central control station, said routing table including a plurality of data rates for use in transmitting data to various subregions within said coverage region, with each of said data rates being uniquely associated with a given one of said subregions.

19. A communications system comprising:
 a central control station for transmitting data at a plurality of different data rates;
 a space-based transponder for receiving said data and transmitting said data at a data rate selected by said central control station;
 a mobile platform operating within a designated coverage region being served by said space-based transponder, and traveling between a plurality of subregions within said coverage region;
 said mobile platform including a receiving subsystem for receiving data from said space-based transponder at a data rate selected by said central control station; and
 wherein said central control station monitors, in real time, a location of said mobile platform and selects, in real time, different data rates for use in transmitting said data to said mobile platform based on which subregion said mobile platform is operating in.

20. The system of claim 19, wherein said central control station selects a data transmission rate for use that is less than a maximum data transmission rate available for use, to transmit data to said mobile platform when said data relates to operation of said mobile platform.

21. A method for communicating comprising:
 transmitting data from a central control station at a selected one of a plurality of different data transmission rates;
 using a space-based subsystem operating in a designated coverage region to receive and transmit said data at said selected data transmission rate;
 receiving said data at a receiving station operating within said designated coverage region;
 selecting a maximum data transmission rate for use that still enables closure of a communications link between said space-based subsystem and said receiving station to be maintained; and
 using said central control station to monitor, in real time, a position of said mobile platform, and selecting which one of said available data transmission rates to use based on a real time location of said mobile platform within said designated coverage region.

22. The method of claim 21, wherein receiving said data at a receiving station comprises receiving said data with a receiver subsystem on board a mobile platform operating within said designated coverage region.

23. The method of claim 22, further comprising changing a data transmission rate as a location of said mobile platform is detected to have changed from a first subregion to a second subregion within said designated coverage region.

* * * * *